United States Patent [19]
Frazier

[11] Patent Number: 5,148,385
[45] Date of Patent: Sep. 15, 1992

[54] SERIAL SYSTOLIC PROCESSOR

[75] Inventor: Gary A. Frazier, Garland, Tex.

[73] Assignee: Texas Instruments Incorporated, Dallas, Tex.

[21] Appl. No.: 715,721

[22] Filed: Jun. 14, 1991

Related U.S. Application Data

[63] Continuation of Ser. No. 10,619, Feb. 4, 1987, abandoned.

[51] Int. Cl.$^5$ .................... G06F 15/336; G06F 7/38
[52] U.S. Cl. ..................... 364/728.07; 364/736
[58] Field of Search ........ 364/728, 754, 200 MS File, 364/736, 728.03-728.07

[56] References Cited

U.S. PATENT DOCUMENTS

| | | | |
|---|---|---|---|
| 4,032,885 | 6/1977 | Roth | 364/728 |
| 4,158,234 | 6/1979 | Grandchamp | 364/728 |
| 4,161,033 | 7/1979 | Martinson | 364/728 |
| 4,347,580 | 8/1982 | Bond | 364/728.05 |
| 4,489,393 | 12/1984 | Kawahara et al. | 364/728 |
| 4,493,048 | 1/1985 | Kung et al. | 364/728 |
| 4,498,155 | 2/1985 | Rao | 365/189 |
| 4,660,164 | 4/1987 | Leibowitz | 364/728 |

OTHER PUBLICATIONS

A. Michelson et al., "Error-Control Techniques for Digital Communication", 1985, p. 27.

Primary Examiner—Long T. Nguyen
Attorney, Agent, or Firm—Richard A. Stoltz; Richard L. Donaldson; Jay Cantor

[57] ABSTRACT

A serial systolic processor for performing neural network functions. A serial processor (90) provides the digital processing circuits for processing an input serial data stream applied to a serial input (20). A memory (29) stores digital signals representative of interconnection strengths or coefficient data corresponding to autocorrelation matrix elements. Plural outputs ($A_0$–$A_n$) of the memory (29) are connected respectively to each of the processor neurons ($P_0$–$P_n$) of the serial processor (90). The digital stream is output, unchanged, on processor output bus (22), while a processed data stream is output on bus (30).

29 Claims, 6 Drawing Sheets

SERIAL SYSTOLIC PROCESSOR

This application is a continuation of application Ser. No. 07/010,619, filed Feb. 4, 1987, now abandoned.

TECHNICAL FIELD OF THE INVENTION

The present invention relates in general to neural networks, associative memories, correlation matrices, and the like, and more particularly relates to methods and apparatus for digitally processing noisy or corrupted data to efficiently provide a decoded or correlated output.

BACKGROUND OF THE INVENTION

As societies grow and expand in terms of intelligence and communications, the knowledge and information gained also grows, but at an exponential rate. Concomitant with the growth of societies, the need to exchange information also grows and expands.

Information transmitted, whether by light or electrical signals, must be converted into an appropriate format for transmission through conventional facilities. The transmission facilities normally include receivers which decode the information and convert it into an appropriate form for eventual use. The information is subject to corruption as a result of the transmission and receiving equipment, as well as by any transmission medium connected thereto.

Techniques are currently available for encoding information into a special format so that errors arising from the transmission of the coded information can be readily detected. In addition to error detection, some coding schemes also provide for error correction. These error detection and correction systems operate satisfactorily when only a few errors occur. However, in noisy environments where the corruption of the coded information becomes appreciable, no practical error correction scheme is available. While error detection and correction schemes are theoretically feasible in systems incurring high transmission error rates, the practical shortcoming is that processing systems currently available cannot perform the extraction of error-free messages from a highly corrupted encoded signal in reasonable periods of time. See P. 27 "Error-Control Techniques for Digital Communication" Arnold M. Michelson, Allen H. Levesque, John Wiley & Sons, New York 1985 ISBN 0-471-88074-4. The real time error correction problem is further exacerbated in high speed information transmission systems, such as is typical in current computer and telecommunication transmission systems.

Neural networks are the subject of contemporary theorizing in connection with pattern recognition. Pattern recognition systems are capable of restoring or recognizing corrupted images or patterns if sufficient artifacts of the representation are available to provide the true representation of the image. In this respect, a neural network is fault tolerant in that the image can be significantly perturbated, but yet after being processed through the neural network the image can be restored. Such systems are also referred to as content addressable memories or fuzzy pattern recognition systems.

Typically, neural networks comprise analog neuron circuits having multiple inputs and an output connected to the inputs of other similar circuits. Such a system is termed "massively parallel" because of the large number of interconnections of such parallel-acting neurons forming a circuit matrix. As is well documented in the literature, a neural network generally comprises a set of nonlinear summing amplifiers coupled by an adjustable connection matrix. The values of the interconnection matrix elements are proportional to the autocorrelation matrix associated with the desired stable states of the network. The strength of a network connection can be expressed mathematically as:

$$1/R_{ij} \propto \sum_s V_i^s \cdot V_j^s,$$

where $V^s$ are the stored states of the network, and $V_i^s$ is the ith component of the Sth state stored. The nonlinear amplifiers are constructed using zero crossing comparators.

While neural networks theoretically represent a solution to correlation problems, such networks are not practically feasible with today's technology because of the massive innerconnection problem. The innerconnection problem only worsens when integrated circuits are scaled to provide high density packing, which is the current trend with microelectronics.

From the foregoing, it can be seen that a need exists for a computational network which can perform associative and correlation functions in accordance with current digital processing methods and apparatus. More particularly, a need exists for a digital systolic processor which can perform high speed correlations and associations of high speed serial data with neural network matrix connections using a conventional random access memory. Another need exists for providing a method of applying the attributes of neural networks to new applications not heretofore attempted.

SUMMARY OF THE INVENTION

In accordance with the present invention, the disclosed methods and computational apparatus eliminates or substantially reduces the disadvantages and shortcomings associated with the prior art methods and devices. According to the computational building block of the invention, a sequential-operating systolic digital processor is disclosed for performing correlation and associative functions. The invention is well adapted for processing high speed serial bit streams to perform functions such as, error correction, pattern matching, language recognition, and signal processing such as filtering, signal convolutions, interpolation and geometric warping.

The invention described herein comprises a serial digital system which does not include the massive parallel connections of prior art circuits, but which performs a correlation of electrical states as if the circuit were massively parallel connected. The associative memory of the invention also does not perform the parallel correlation of the circuit states simultaneously, but instead implements a correlation serially over a period of time. In contrast with prior neural network techniques which operated asynchronously, or stochastically, the present preferred invention processes serial data streams in a sequential manner such that the state of each "neuron" is processed serially, taking into consideration the states of all the other neurons of the matrix.

In the preferred form of the invention, the associative memory of the invention comprises a serial data processor with an input serial data bus and an output serial data bus. The processor further includes a plurality of other inputs connected to a semiconductor digital memory. The memory constitutes an N×N network with stored data which is synonymous with the interconnection strengths of neurons. Essentially, a number of serial registers of the data processor form the neurons, while the two dimensional array of memory cells form the interconnections between the neurons.

In accordance with the invention, the memory includes a row address selector which selects the data of an entire row of memory cells to be output from the processor. As data is serially shifted through the serial processor, from the input bus to the output bus, such data is also processed with the memory data which is clocked into the processor in synchronism with the serial data shifting therethrough. In this manner, the state of each shift register neuron is processed or correlated according to the innerconnection matrix strength of the data read from the memory.

When the associative memory of the invention is used in connection with neural network functions, each shift register neuron includes a binary counter forming a totalizer to store the final state of the associated neuron. An EXCLUSIVE-OR logic circuit in the serial processor processes or correlates the data shifted therein from the input serial bus with one output of the memory to thereby increment or decrement the counter. A preset state of the counter forms a threshold to determine whether the final state of the neuron should be a logic zero or a logic one.

In another embodiment of the invention, data processing for correlation and other similar functions are obtained by serially shifting data through the processor in one direction from the input serial stream, and simultaneously processing such information at each neural node with data read from the memory. The processing of the input data and the memory data is in the nature of an arithmetic digital multiplier function. An additional serial shift register string moves data in an opposite direction, and further combines the output of the multiplier function with the result of a preceding shift register output. In this manner, a left going result is modified by the operation of each neural cell.

BRIEF DESCRIPTION OF THE DRAWINGS

Further features and advantages will become more apparent from the following and more particular description of the preferred embodiment of the invention, as illustrated in the accompanying drawings in which like reference characters generally refer to the same parts or elements throughout the views, and in which.

DETAILED DESCRIPTION OF THE INVENTION

Figure 1:
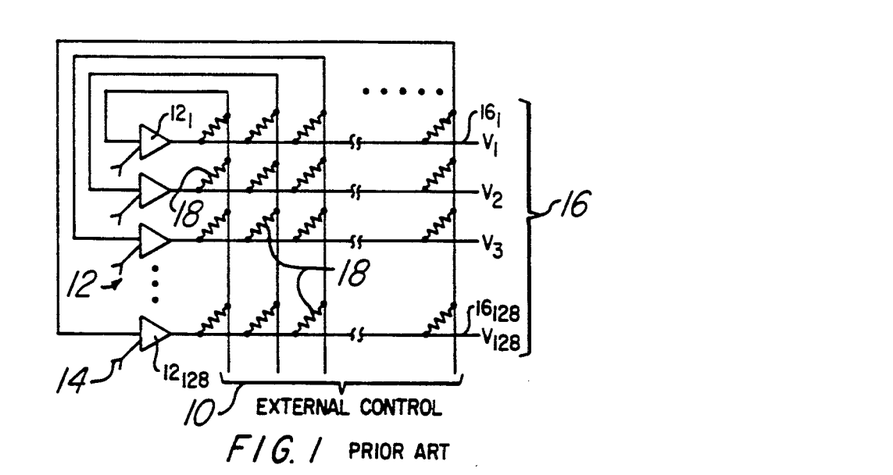
FIG. 1 is an electrical schematic illustration of an analog neural network, well known in the art.

In order to facilitate the appreciation and understanding of the instant invention, reference is made initially to FIG. 1 where there is illustrated a conventional analog neural network. The basic neural network includes a plurality of inputs 10 coupled to a corresponding plurality of active elements normally comprising thresholding comparators, designated generally as 12. Each comparator 12 includes a threshold input 14 for establishing the switching condition for each comparator. In addition, each comparator 12 is provided with an output forming an output 16 of the network. Each comparator 12 comprises a neuron of the network. The subscript notation of the reference characters is utilized to illustrate that the neural network of FIG. 1 has one hundred twenty-eight inputs, outputs and comparators.

In order for each neuron to settle to an output state based on the states of the other neurons, each comparator output is connected by a plurality of feedback elements, such as a resistor 18, to the inputs of all the other comparators or neurons. The feedback element resistor values form interconnection strengths which are programmed such that the system is forced through dynamic, electrical feedback into a few desired stable electrical states. Each stable network state represents a chosen or predetermined stored state of the network system.

The associative or correlation functions of a neural network can be understood by realizing first that a predetermined state of the network output 16 is produced in correspondence with signals applied to the external control input 10. The network is massively connected, as noted, such that once an input is applied to the external control 10, an output is produced within a few comparator throughput delay periods. The system is asynchronous or stochastic, in that the individual states of the neurons are determined asynchronously with respect to the other neuron states. Accordingly, the massively connected neural network produces an output very quickly after an input has been applied.

Importantly, it is not necessary to apply an input to all of the possible inputs 10 in order for the network to dynamically settle to a stable state. For example, if an input signal is applied to only the first sixty-four inputs 10, then those comparators, or neurons, not driven into a selected state by the action of this input will eventually attain stable output states. This result is due to the highly connected nature of the network which allows partial information inputs to induce a complete, stable output state in a short period of time.

Moreover, it is not necessary nor desirable to maintain the inputs 10 in order to achieve the correct operation of the network. In usual practice, a signal is applied to the inputs 10 until all of the network comparators 12, or neurons, have switched into a state where each comparator output equals its applied input value. The input 10 is removed and the network is then allowed to settle autonomously into one the prestored stable states of the network. It is well known that the convergence rate of a stochastic system of the type shown in FIG. 1, toward a stable output state, is independent of the number of internal network states.

The associative properties of neural networks have been explored extensively by John Hopfield. In accordance with the unique properties of neural networks, when corrupted or imprecise signals are applied to the network input 10, the output 16 will produce the "best guess". Through statistical and mathematical proofs, it can be shown that when an input signal changes, due to noise or other perturbations, by a factor of up to twenty-five percent, the neural network will settle over the time into a state which is most similar to the applied signal. Laboratory results have confirmed that with a neural network of twelve simple voltage comparators interconnected with fixed resistors, three-bit states can be stored therein and recalled from the network within two comparator propagation delays. Furthermore, and importantly, when up to twenty percent of the network weighting resistors were removed, the output still reproduced a correct representation of the input. The fault tolerant, error-correcting features of a neural network are thereby apparent.

As noted above, the theory of analog neural networks has been thoroughly investigated and made the subject of many papers, and the attributes thereof are without question. However, in practice, actual circuit implementations are limited to a few neurons. As the number of neurons increase, the flexibility and use of the matrix becomes more important, but the massive parallel connections required are difficult to implement. Particularly, as the size of the neural network increases, the integration thereof into a semiconductor integrated circuit becomes extremely difficult. Hence, neural networks of any practical application have not thus far been fabricated in integrated circuit form.

It is also feasible that a serial program-controlled microprocessor could simulate the operation of a neural network. By a reiterative and arduous sequential processing of an input serial bit stream according to an algorithm, an output associative function can be realized. While this process is feasible, such a program controlled processor encounters severe time constraint problems, especially if the input data stream is characterized even by a modestly high frequency or bit rate.

The associative memory of the invention is a nonprogram controlled systolic processor which decomposes the overall internal operations of an analog neural network into sequentially performed suboperations to provide an overall result a delayed period of time later. The overall functional similarity of an analog neural network to the sequential systolic processor will be described in more detail below. It is sufficient here to understand that an N-input analog neural network is equivalent to an N-bit sequential digital processor constructed in accordance with the invention, clocked N times. The analogy between the sequential systolic processor of the invention to that of the analog neural network can be appreciated when it is realized that each sequential stage of the processor computes a sum, and the overall results thereof accurately provide an output, irrespective the order in which the sums are computed. Thus, the summation process can be conducted serially by the systolic processor of the invention to produce a result corresponding to the stochastic parallel and instantaneous calculation which is characteristic of a massively-parallel-connected analog neural network.

In order to more fully understand the digital implementation of the serial correlation processor, an analysis of the analog neural network operation follows. Referring to FIG. 1, assume that the values of the resistors 18 have been selected such that the electrical conductance of each resistor is given as:

$$1/R_{ij}^s = \sigma_{ij}^s = V_i^s \cdot V_j^s$$

where $V_i^s$ is the ith component of the desired predetermined stable state of the network, and Rij is the resistor at the intersection of the ith row 16i and the jth column 10j.

Given these conductance values, the total current entering column 10j and therefore the total current input to comparator 12i is given as:

$$I_i = \sum_{j=1}^{n=128} \sigma_{ij}^s \cdot V_j$$

Each comparator has a separate threshold input so that the comparator will switch to output $+1$ or $-1$ depending upon whether the difference between the total current applied to the input of comparator 12i is above or below this threshold value respectively. Mathematically, the output of each comparator is then given by:

$+1$ if $(I_i - \text{Threshold } i) \geq 0$ $-1$ if $(I_i - \text{Threshold } i) < 0$ Assume now that a vector V is applied to the inputs 10 such that each comparator 12, or neuron, outputs an identical vector V at the output 16, independent of the value of the comparator threshold values. This amounts to presetting the network state equal to the applied vector V. Assume further that the applied vector is similar to but not equal to the stored state of the network $V^s$.

After the applied input is removed, the network will no longer be constrained to a particular initial state, and will dynamically change state according to the row outputs, column currents, and threshold settings. For simplicity, assume that all of the threshold settings are zero(0) so that the comparators act as zero current crossing comparators with outputs given by:

$+1$ if $I_{in} \geq 0$ $-1$ if $I_{in} < 0$

If neuron i is examined, it is seen that the total current applied to the input of neuron i, just after the inputs 10 have been removed, is given as:

$$I_i = M \sigma_{ij}^s V_j^s + (N-M) \sigma_{ij}^s (-V_j)$$

or $$I_i = (2M-N) V_j^s \sigma_{ij}^s$$

where M is the number of vector components of V which are identical to the vector components of the stored state $V^s$, and N is the number of neurons in the network.

Under the assumption that the initial state was similar to the stored state of the network, it is clear that M=N so that the sign of the input current to neuron i is in fact equal to the sign of the stored state component $V_i^s$. Finally, since the threshold point was set at zero, neuron i will rapidly switch to the state $V_i^s$. In this manner, the entire network will dynamically and rapidly converge from some initial state V, to the stored state $V_s$.

If it is desired to store more than one state in the neural network, the interconnection conductances are modified such that:

$$1/R_{ij} = \sigma_{ij} = \sum_{s=1}^{\text{stored states}} \sigma_{ij}^s = \sigma_{ij}^1 + \sigma_{ij}^2 + \ldots$$

Importantly, it has been shown theoretically and demonstrated empirically that it is possible to store as many as N/4LogN independent states within such a network, and still observe the property that the network will converge from an arbitrary initial state to the most similar stored state of the network.

Instead of applying input vectors comprising binary (+1, −1) states, but rather by using input vectors having digital states, and a connection matrix, $(T_{ij})$ also having digital states, an ideal correlator can be constructed using an EXCLUSIVE-OR logic function. Such a digital correlator, to be described in more detail below, provides a strong output correlation when the compared digital bits are both a logic one, or both a logic zero. Otherwise, the digital correlator provides an opposite output result.

Figure 2:
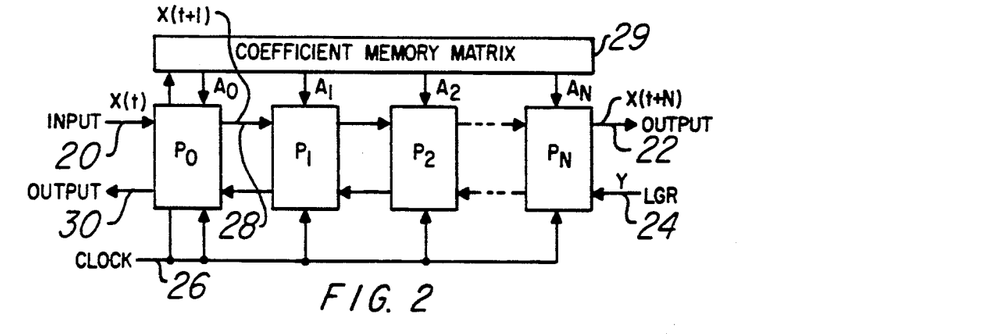
FIG. 2 is a block diagram of an electrical digital circuit which functions as a massively connected network to provide correlation and associative functions.

The principles and concepts of the invention are more readily understood by referring to FIG. 2 of the drawings. According to the invention, a series of data processors $P_O-P_n$ are arranged in series with a serial data input 20 and a serial data output 22. An oppositely directed serial bus having a left going result (LGR) input 24 is also serially connected between the processor units $P_O-P_n$. Matrix connection strength information is provided each processor by an associated input, designated respectively $A_O-A_n$. Each processor P is connected by a common clock line 26 to synchronize the operation of the computational system.

Data is input serially to the first processor $P_O$ on input bus 20 at time (t). Processor $P_O$ outputs the identical data on output bus 28 at a later time (t−1). Thus, on each clock cycle the input data is transferred, unchanged, serially from one processor to the next processor. Importantly, the data which is serially input to the respective processors $P_n$ is also processed with the data from a connection matrix 29 by the respective A inputs. Each processor P processes the input data together with the matrix connection data to produce an internal result. The internal result of each processor P is additionally processed with data on the left going result bus 24. The left going result bus 24 is different from the input data bus 20, in that the data output by each processor P on the LGR 24 is different. The LGR input 24 may be grounded for processor $P_n$, but thereafter the value thereof is dependent on the result of the processing by each subsequent processor. The final serial result of the systolic processor is provided on output 30.

In operation, each data value x(t) shifted into the processors is processed m times with respect to each connection matrix parameter $A_O-A_n$. Simultaneously, the data on the left going result 24, which is initialized to a predetermined state at the input of processor $P_n$, is processed in each processor using the input connection matrix data $A_O-A_n$. After the serial computation is completed the clocking continues until a result is produced in serial form on output 30. Correlation and similar associations can be provided using the basic serial systolic processor of FIG. 2.

Figure 3:
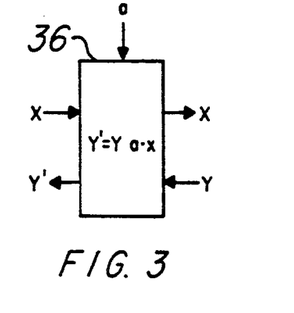
FIG. 3 is a functional diagram of a vector-matrix multiplier for providing multi-purpose boolean functions.

A mathematical equivalent representation of processor $P_O$ is shown in FIG. 3. As can be seen, there is an input and output designated x which remain unchanged by the internal processing of processor 36. An oppositely directed input y and associated output y' are connected to the processor 36. The output y' may undergo a change with respect to the input result of the processing of processor 36. A coefficient input A is also presented to the processor 36. The mathematical operation carried out by the processor 36 is characterized as y' = y+(a·x).

Figure 4:
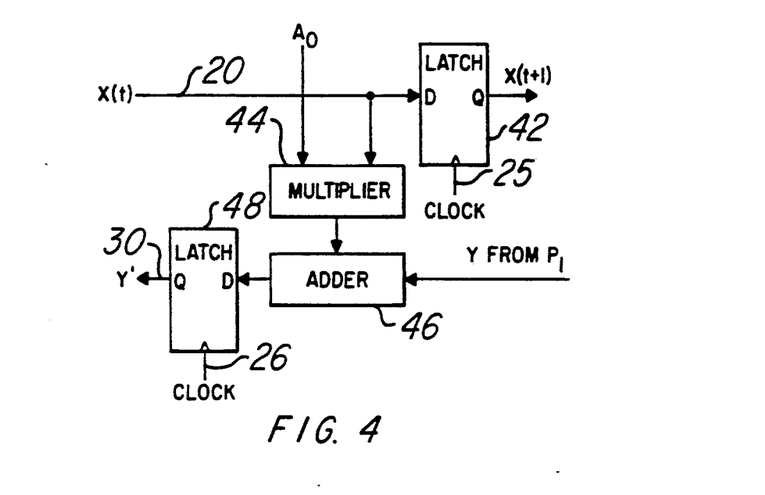
FIG. 4 is a simplified electrical diagram of a digital processor of the invention.

FIG. 4 illustrates a portion of the serial processor $P_O$ of FIG. 2. In particular, FIG. 4 illustrates the data processor $P_O$ of FIG. 3. It is to be understood that the data processors $P_1-P_n$ of FIG. 2 are similarly constructed. The data processor $P_O$ includes a temporary storage latch 42 with its D input connected to the input serial bus 20. The latch 42 is also provided with a Q output which drives the D input of a similar latch in the $P_1$ processor. The input of the latch 42 is also connected to one input of a digital multiplier 44. Another input of the multiplier 44 is connected to a $A_O$ coefficient memory output. The output of the multiplier 44 is connected to one input of a digital adder 46. Another input of adder 46 is connected to the LGR output of the $P_1$ data processor. The output of adder 46 is connected to the D input of a second D type latch 48. The latch 48 is of the type having a Q output which drives the output serial bus 30 of the $P_O$ processor. Latches 42 and 48 are synchronously driven by the clock signal 26. The latch 42 provides a temporary storage element such that the input data on input bus 20 is identical to that on the Q output bus x(t+1), except for a delay which corresponds to the period of the clock 26. The terms x(t) and x(t+1) signify the delayed nature of the data on the respective input and output busses 20 and 28. The logic function transpiring between the y and y' busses is expressed as:

$$y' = y (a \cdot x).$$

The multiplier 44 provides information processing, whereby the memory matrix data currently available on the $A_O$ is automatically multiplied with the x(t) data and the result thereof presented as an input to the adder 46. The left going result produced by the $P_1$ processor is automatically added with the output of multiplier 44. Similar to the operation of latch 42, the latch 48 provides storage and a delay for the data output from adder 46 to the output 30.

Figure 5:
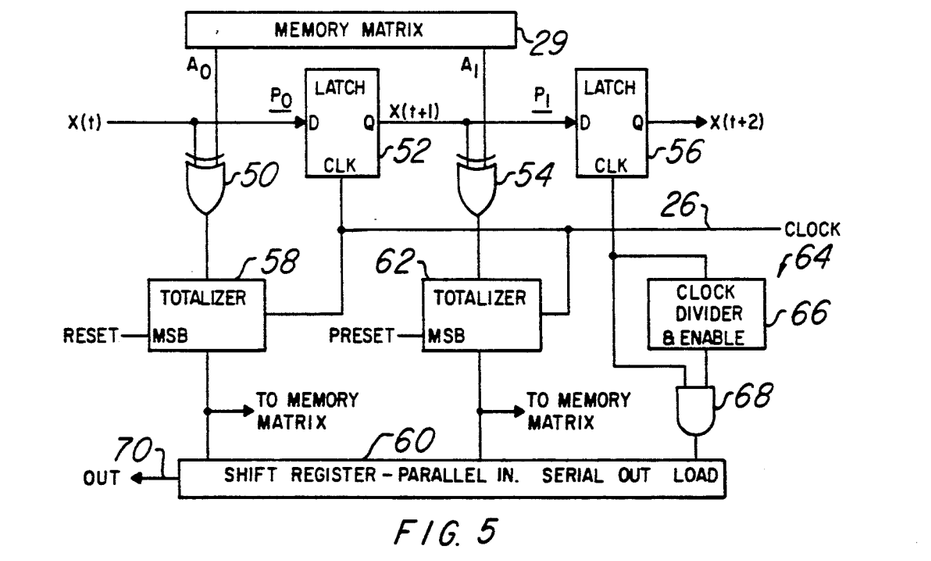
FIG. 5 is a detailed electrical schematic of a pair of neurons constructed in accordance with the invention.

FIG. 5 is a schematic illustration of a pair of systolic correlation processors capable of providing neuron functions. The correlation processors $P_O$ and $P_1$ of FIG. 5 perform functions more specialized than those of the processor illustrated in FIG. 4. The systolic correlation processor of FIG. 5 is shown as two independent stages, but in practice many more stages would be typical. With regard to the processor $P_O$, an input serial bit stream x(t) is connected in parallel to one input of an EXCLUSIVE-OR gate 50 and to the D input of a latch 52. The output x(t+1) of the latch 52 is connected to an EXCLUSIVE-OR gate 54 and a D type latch 56 of an adjacent processor $P_1$. The EXCLUSIVE-OR gate 50 of processor $P_O$ has another input for receiving $A_O$ coefficients from the memory matrix 29. The output of the logic gate 50 is connected to a totalizer 58 which comprises a counter. The output of the totalizer 58 is connected to a shift register 60, which may be of the parallel-in, serial-out type. Processor $P_1$ is also provided with a totalizer 62 which is also connected to the shift register 60. A clock 26 is common to all the clocked circuits of the systolic correlation processor. The shift register 60 is controlled by a clock control circuit 64 including a clock divider and enable 66 and an AND logic circuit 68 connected to the clock input of the shift register 60.

In order to more fully understand the digital implementation of the serial correlation processor, an analysis of the digital correlation network operation follows. Referring to FIG. 5, assume that the values of the memory matrix 29 have been selected such that the value of each memory location is given as:

$$A_{ij}^s = V_i^s \oplus V_j^s$$

where $V_j^s$ is defined as the jth component of the desired, predetermined stored state of the network. The term $\oplus$ represents an EXCLUSIVE-OR logic function.

The location in the memory matrix 29 of the matrix element Aij is selected such that the sequential clocking of the serial processor causes the arrival of the input vector component bit Xj to coincide with the arrival of the Aij coefficient to the serial processor Pi.

If it is desired to correlate against more than one stored state in the memory matrix 29, each of the memory matrix elements are given by:

$$A_{ij} = 1 \text{ if } \Sigma A_{ij}^s \geq \frac{Q}{2}$$

$$A_{ij} = 0 \text{ if } \Sigma A_{ij}^s < \frac{Q}{2}$$

where Q is the number of stored states in the memory matrix 29.

Correlation functions of the systolic processor of FIG. 5 can be accomplished by shifting serial data to be correlated to the x(t) input of processor $P_O$. Simultaneously, the serial data is stored in the latch 52, and memory matrix data is made available on the $A_O$ input. If there is a correlation between the digital data on the inputs of the EXCLUSIVE-OR gate 50, an indication thereof will be registered in the totalizer 58. Correlation in the digital sense means the correspondence of a pair of logic highs, or a pair of logic lows, on the input of the EXCLUSIVE-OR circuit 50. When this occurs, the output of the EXCLUSIVE-OR gate 50 will be a logic low which is applied to the totalizer 58. The totalizer 58 may be a clocked counter in which counting is enabled by a logic low on the output of the EXCLUSIVE-OR gate 50. Of course the system would be initialized by resetting the totalizers 58 and 62 to a predetermined output before a correlation function is to be preformed. Because the totalizer 58 is enabled only on the correlation of the data on the x(t) input with the memory matrix data on the $A_O$ input, the output of the totalizer 58 will yield an indication of the number of correlations.

In accordance with a feature of the systolic correlation processor of the invention, the totalizer 58 can be of the up/down type of counter. In this event, the output of the EXCLUSIVE-OR gate 50 would be connected to the up/down input of the counter totalizer 58. In accordance with conventional operation of up/down counters, the counter would count in one direction with a logic low on its up/down input, and in the other direction with a logic high on the up/down input. With this arrangement, the most significant bit (MSB) of the totalizer 58 would provide an indication of whether a majority of the EXCLUSIVE-OR comparisons resulted in correlated data, or uncorrelated data. An indication of uncorrelated data would be registered when data on the x(t) input is a logic zero, and memory matrix data on the $A_O$ input is a logic one, or vice versa.

After each bit of the serial data stream appearing on the x(t) input has been compared with memory matrix data on the $A_O$ input, the MSB output of the totalizer 58 will register the correlated or uncorrelated result. For example, if there are N bits on the x(t) input, then after N clock cycles, the MSB output of the totalizer 58 will provide an indication of correlation or non-correlation. The Nth bit on the x(t) input to be correlated has not yet reached processor $P_1$, and thus the output of the totalizer 62 will not yet yield a valid result of the correlation provided by the $P_1$ processor.

Because of the clock control circuit 64, the shift register 60 is not activated until N clock pulses have occurred. After N clock pulses, an output is provided by the clock divider and enables circuit 66 to thereby allow the clock pulses to propagate through the AND gate 68. The shift register 60 is then loaded with the MSB output of the totalizer 58. Thereafter, the output of each of the other totalizers will sequentially produce respective indications of correlated data for storage in the shift register 60. After 2N clock pulses, the Nth totalizer (not shown) will provide a valid output of the correlated data resulting from the $P_n$ processor. However, clocking of the shift register 60 can begin after the Nth clock pulse to provide correlation indications at its serial output 70. Subsequent clock pulses will provide shift register outputs of the processors $P_1$, $P_2$, . . . etc. Therefore, after 2N clock pulses, correlations of N bits appearing on the x(t) input have been conducted, and the results thereof begin appearing on a serial bit stream at the output 70 of the shift register 60. In addition, the output of the $P_n$ systolic correlation processor will have provided to other circuits, if necessary, the data originally input at the x(t) input, but delayed by N clock cycles.

Figure 6:
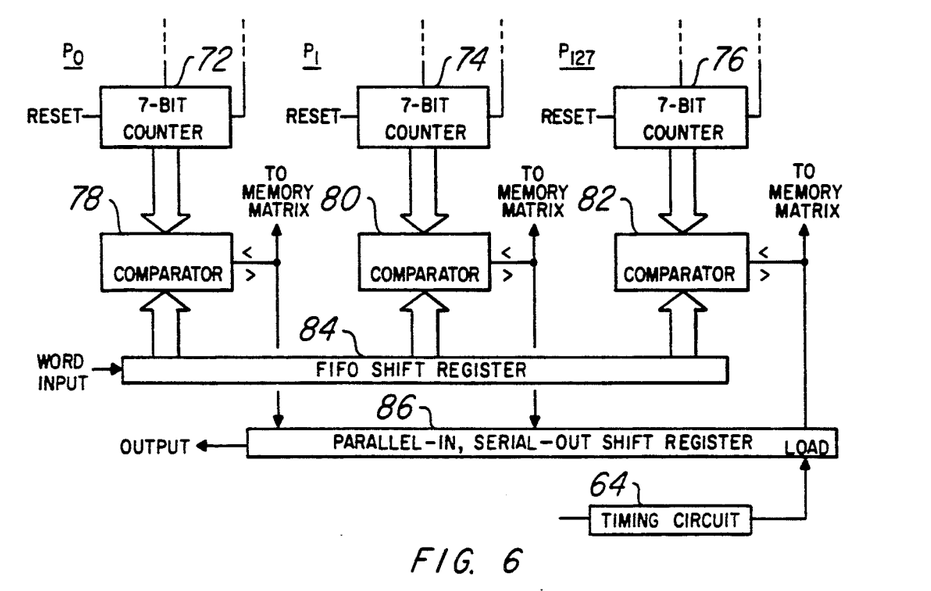
FIG. 6 is a schematic diagram of one embodiment of the invention for providing a comparison with a totalizer output to determine the state of a correlated digital signal.

With reference again to FIG. 5, it can be appreciated that each bit on the serial input x(t) of the processor $P_O$ undergoes N comparisons. Moreover, after each bit has visited each of the processors or neurons, a compared result thereof is registered in each of the N totalizers. In the event the counter output of the totalizer is the most significant bit, it can be rerouted as data for storage back in the memory matrix 29, or it can be shifted through the shift register 60 for subsequent processing. In the event the totalizers comprise counters 72-76, as shown in FIG. 6, the counter outputs can be applied to one input of respective digital comparators 78-82 for comparing against another digital word. A first-in first-out (FIFO) shift register 84 may be utilized to provide another digital word for input to the comparators 78-82 for comparing with the outputs of counters 72-76. Digital comparators utilized for comparing two bytes of data are well known in the art. Such comparators 78-82 can provide output indications of whether the compared digital words were greater than, less than, or equal to each other.

Similar to the arrangement shown in FIG. 5, the circuit of FIG. 6 may include digital comparator outputs connected to the memory matrix, and/or connected to a parallel-in, serial-out shift register 86. A clocking circuit is effective to control the loading of the shift register with comparison results from the comparators 78–82. The circuit of FIG. 6 is synchronously clocked to provide the data processing in an orderly sequence, and for output of the comparison results from the shift register 85.

Figure 7:
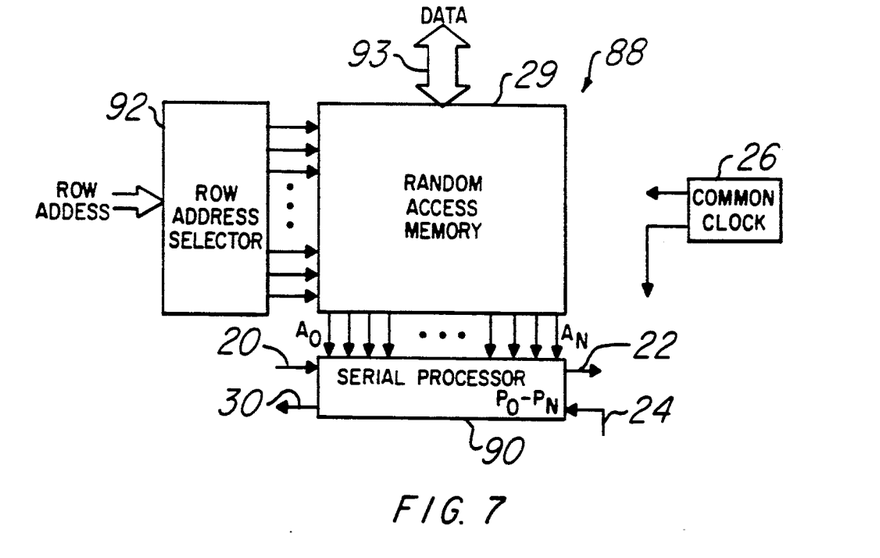
FIG. 7 is an electrical schematic diagram of a digital matrix constructed to provide a neural network function.

FIG. 7 illustrates the serial systolic processor 88 constructed in accordance with the principles and concepts of the invention. The serial systolic processor includes a serial processor 90 which incorporates the processors $P_O$–$P_n$ described above in FIGS. 2, 5 or 6. The inputs and outputs of the serial processor 90 are similarly designated. The connection matrix 29 comprises a semiconductor memory connected by $A_O$–$A_n$ outputs to the serial processor 90. The memory 29 is preferably of the random access type. The random access memory matrix 29 includes a row address selector 92 to which row addresses are applied. The row address selector 92 decodes the row addresses to provide a unique selection of a row of N storage cells of the memory array 29. In contrast with conventional random access memories, when the row address selector 92 provides access signals to the memory cell matrix 29, N cells are read and the contents thereof are output to the serial processor 90 on output bus $A_O$–$A_n$. Certain video memory applications similar to this structure are disclosed in U.S. Pat. No. 4,498,155 by Rao, assigned to the assignee hereof.

The serial processor 90 further includes a bidirectional data bus 93 for inputting and outputting serial data to the memory matrix 29. Interconnection strength data in the form of coefficient data may be written into the memory 29 prior to the processing of data by the processor 90 from input data bus 20. Also, correlated results may also be written into unused sections of the memory 29 during or after the correlation process. Conventional bus multiplexers may be utilized in controlling whether coefficient data or correlated results are input into the memory 29. Correlation results stored in the memory 29 may also be retrieved by reading the memory 29 and outputting the results on serial data bus 93.

The synchronous operation of the systolic processor is controlled by the common clock 26 which controls the operation of the memory 29 as well as the serial processor 90. In this manner, when a memory read operation occurs the stored interconnection strength data is provided on every sequential shift of input data occurring on respective input serial processor busses 20. In contrast with the neural networks and similar associative memories heretofore known, the connection strength by which the serial data on input bus 20 is processed comprises monopolar signals, i.e. digital zeros or ones stored in the memory cell array 29. Similar to the selection of resistor values in the analog neural network, connection strengths are provided to the systolic processor 90 of the invention by writing bipolar digital ones or zeros into the random access memory 29.

The pattern of ones or zeros is selected according to the particular operation desired of the systolic processor. For example if correlation or associative functions, for instance speech recognition, is desired, the memory 29 would be loaded with coefficient data corresponding to autocorrelation matrix elements of speech frame vectors. Such autocorrelation matrix elements would normally be related to speech parameters such as cadence, pitch, syllables, etc. For processing code symbols to remove perturbations incurred during transmission or receiving, the memory 29 would be loaded with coefficient data corresponding to the autocorrelation matrix elements of the coded symbols utilized in encoding the transmitted information. In order to process image information for recognition purposes, the memory 29 would be loaded with coefficient data corresponding to the autocorrelation matrix elements of the desired image.

In the speech recognition application, the speech signals would be converted into a coded digital format and transmitted over a suitable medium. A receiver would decode the signals and present the speech signals in serial digital form to the serial systolic processor 90 on input bus 20. A correlation would then be made between the serial data and the coefficient data stored in the memory 29. The output 30 would comprise digital signals representative of the words or speech input to the transmitter.

The systolic processor shown in FIG. 7 can be fully implemented into a single integrated circuit using current silicon semiconductor fabrication techniques. There is a simple one-to-one correspondence between the $A_O$–$A_n$ outputs of the memory 29 and the inputs to the serial processor 90. Thus, the traditional pitch and connection problems associated with increasing the number of circuits within an integrated circuit chip do not pose a serious disadvantage to the implementation of the invention into an integrated circuit. Indeed, and as will be more fully appreciated from the ensuing description, the serial processor 88 comprises relatively few logic elements, and thus it can be easily implemented into memory chips without imposing severe constraints on the wafer area.

Figure 8:
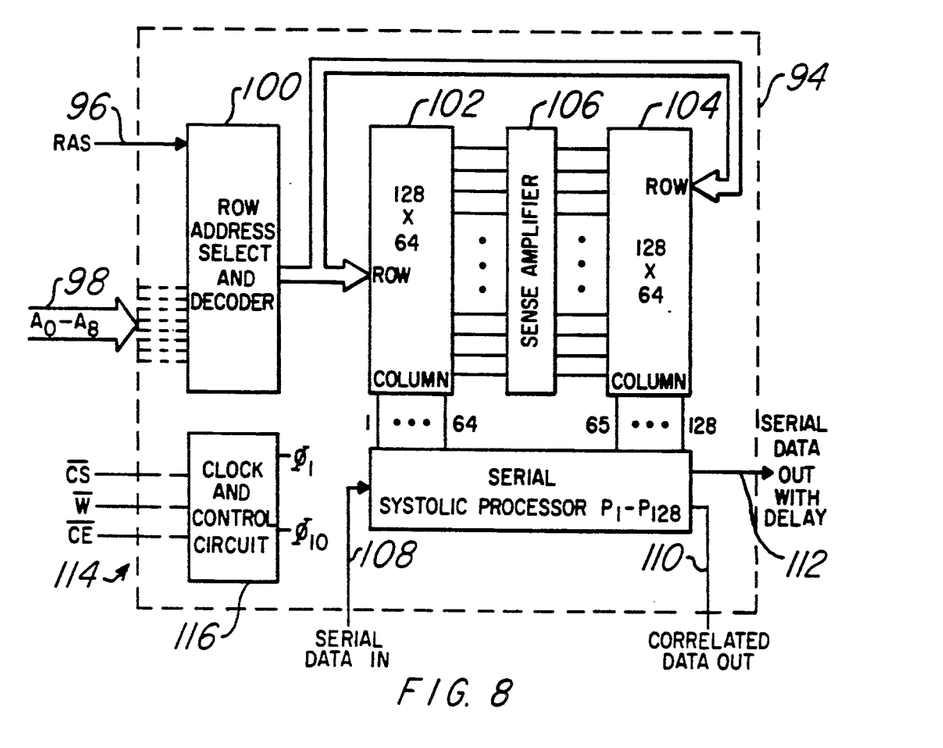
FIG. 8 is a detailed electrical schematic of an integrated digital neural network integrated with a DRAM.

FIG. 8 illustrates a dynamic random access memory (DRAM) and a serial systolic processor integrated into a single chip 94. The DRAM comprises a coefficient memory matrix which stores digital states corresponding to connection strengths, heretofore provided by the analog network resistors. The circuit of FIG. 8 is illustrative of an N=128 neuron network.

The illustrated integrated circuit chip 94 includes a row address selector input 96 and an address bus input 98 coupled to a row address select, and decode circuit 100. The row address select and decode circuitry 100 is adapted for selecting a single row of the cell matrix which comprises a first 128×64 cell array 102 and a second 128×64 cell array 104. Together, the arrays 102 and 104 form a 128×128 cell matrix. There are also 128 sense amplifiers 106 which are operative to detect whether each of the 128 cells in a selected row have stored therein a logic one or a logic zero. Each cell array 102 and 104 includes 64 outputs which are coupled to an associated serial systolic processor $P_1$–$P_{128}$.

In contrast with prior DRAM structures, each time a single row of the cell arrays is addressed, the contents of 128 cells are read and output to the respective serial systolic processors $P_1$–$P_{128}$. U.S. Pat. No. 4,498,155 by Rao is also effective to provide multiple column readouts with a single row access. The systolic processors $P_1$–$P_{128}$ are provided with a serial data input 108 and a correlated serial data output 110. In addition, the serial systolic processor also includes a serial data output 112 which outputs data identical to that on the serial data input 108, except that each bit is delayed by 128 clock cycles. The integrated circuit 94 also includes a typical chip select, write control and chip enable input signals 114 which are coupled to a clock and control circuit 116. The clock and control circuit is a multiphase clock structure which provides a number of output clock phases for synchronizing the entire operation of the chip 94.

The foregoing sets forth the operation of the processor of the invention for providing general correlation functions. From the foregoing, those skilled in the art may readily employ the principles and concepts of the invention to provide specific correlation functions which heretofore could not be accomplished at all, or in a very narrow or limited manner, with analog neural networks.

Error control coding is especially applicable for use with the invention, as such coding is increasingly an important aspect of digital computer technology. As noted initially in this disclosure, there is always a chance of an error being introduced in transferring information from one point to another. Errors may corrupt the data at any stage in the communication process, due to soft errors, such as temperature, cosmic rays, medium noise, or receiver noise. Hard errors caused by faulty logic circuits may also occur.

It is well known in the art to encode the intelligence of information and transmit the encoded information to the receiver. Encoding normally adds redundant information to the message so that the receiver can detect, and in many cases correct, faulty received information. Simple error detectors and correctors are conventionally available for correcting minor errors. However, where the encoded message accumulates more than a couple of errors, such equipment is ineffective to correct errors.

In order to simplify the task of message identification there is associated with each of the original messages (or symbols) a unique code word designated to facilitate the correction of transmission errors. The best way found to accomplish this is to associate randomly selected serial strings of logic ones and zeros with each message or symbol. Since random bit strings forming code words are substantially uncorrelated, or orthogonal in message space, the special code words give the receiver the ability of accurately recovering the intelligence from noise or other disturbances imposed on the information during transmission. Code words randomly formed are characterized by maximum distance therebetween. In particular, it is possible to unambiguously determine which of a set of random code words was sent by the transmitter, if there are fewer than N message errors where 4N+1 is the code word length. Since random vectors tend to have fifty percent identical bits, there must be less than twenty five percent errors to guarantee that the received message is clearly closer to one code word than another. There are very few error control codes which can correct twenty five percent message errors efficiently, both as to time and as to hardware.

The correlator of the invention can be used to recover the actual receiver code word by finding the closest match of the received message to one of the known, or "perfect" random code words. This is commonly known as "maximum likelihood decoding" or "minimum distance decoding". The correlator of the invention determines which vector product, between the message and the code book vectors, has the maximum value. This process could be conducted by a sequential processor, however the teachings hereof permit one skilled in the art to perform this correlation test such that the correlation process works in parallel, has a speed of correlation independent of the size of the code book (number of possible messages) and directly provides the original message as well as a filtered code word.

Figure 9:
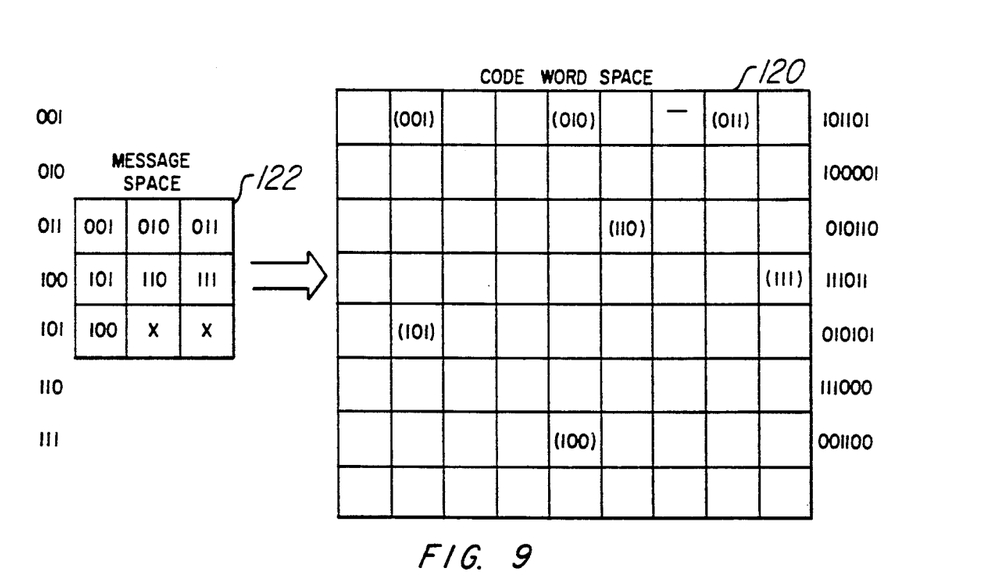
FIGS. 9 and 10 are illustrations showing the mapping of message space into code word space for error detection and correction.

For code decoding and correction, it is necessary first to associate a symbol list with random code words. This is accomplished by arranging a number of possible code words, known as a code word space 120, which is much larger than the number of possible symbols, known as a symbol space 122. This is illustrated in FIG. 9. The encoded information is then transmitted to the receiver. A receiver functioning according to the correlation principles and concepts of the invention includes a correlation matrix having innerconnection strengths satisfying the following equation, where $V_i^s$ is the ith component (bit) of the Sth stored pattern or message.

$$T_{ij} = \sum_{s}^{\text{\# of states}} V_i^s \oplus V_j^s$$

$V_i^s$ and $V_j^s$ are zero and one values corresponding to the digital signals. Much like a Hopfield analog neural network, the innerconnection matrix data is written into the memory of the invention.

After the code words corresponding to the symbols have been transmitted and received, the receiver applies the code word, which is susceptible to degradation or corruption by noise, to the correlation machine described above. The systolic processor of the invention is then relaxed or converged sequentially. By the sequential processing of the code words, the actual symbols representative thereof are found.

Figure 10:
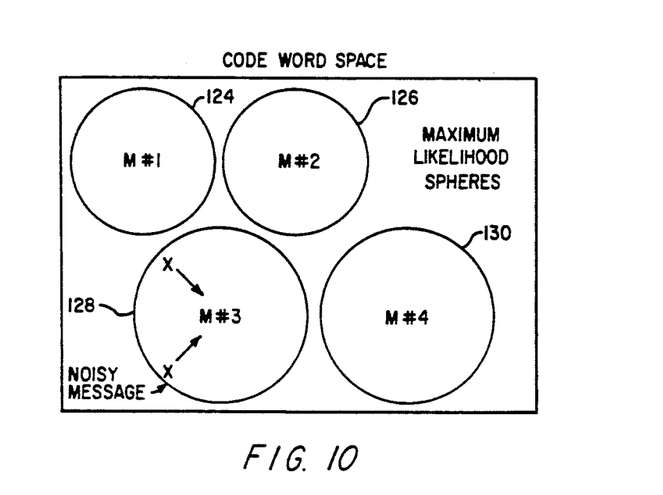

FIG. 10 illustrates a number of hyperspheres 124–130 encircling each digital state of the system, designated by $M_1, M_2, \ldots$ etc. Each circle or hypersphere connotes a code word space in which a noisy code word can lie, and when the system is relaxed, the tendency is toward the center thereof where the exact code word is located. With maximally spaced code words, and when one can unambiguously associate any received data word with a unique code word, the relaxation of the system yields the correct code word. It is also possible to use the correlation machine concept to convert the "best guess" code word directly into the symbol by forming a correlation matrix with the symbol-code word pairs themselves. As a result, a two step process of "best guessing", followed by a code word to symbol table look-up operation will recover the actual symbol initially encoded.

Figure 11:
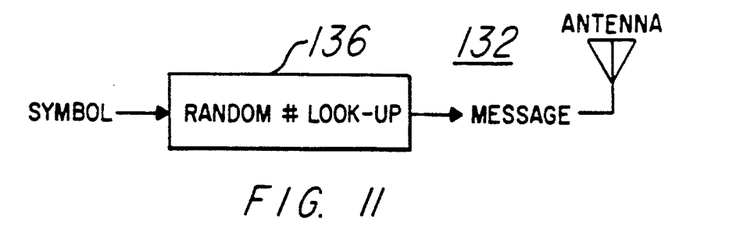
FIGS. 11 and 12 are functional diagrams illustrating an application of error correction.
Figure 12:
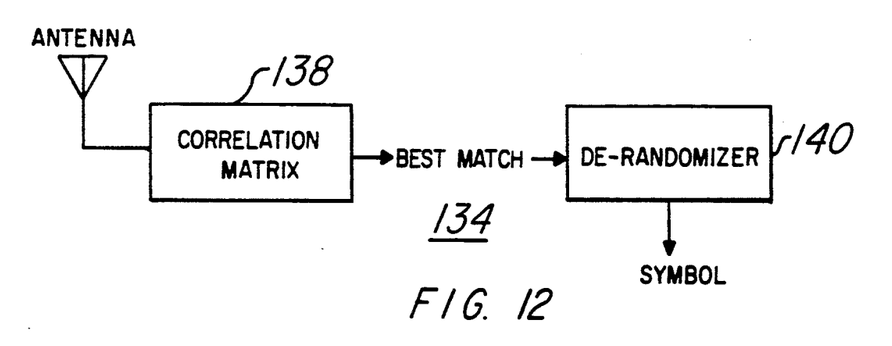

FIGS. 11 and 12 illustrate transmission equipment 132 and receiving equipment 134 adapted to provide error detection and correction of an encoded message. Each symbol utilized in the communication of the particular information is processed through a random number look-up table 136. The symbols are then encoded into the random numbers to form the message to be transmitted. The message is next transmitted and received by an antenna or transmission line system. At the receiver, a correlation matrix 138 is employed to provide the best match between the transmitted code words of the message, and the code words forming a code book. The best match code words are processed by a derandomizer 140 to yield the symbol.

Where there is a substantial chance of significant errors which can perturbate the message, the receiver must maintain a "code book" of all possible incoming data words in order to know which ideal code is closest to the received word. In actual practice using conventional techniques, such a look-up table of code words is not practical, as the code word space is much too large. However, the correlation memory of this invention can perform a mapping of all message space back into a few code words in real time. As a result, the neural correlator of this invention is very advantageous as a real time message filter, especially in high channel noise environments.

Figure 13A:
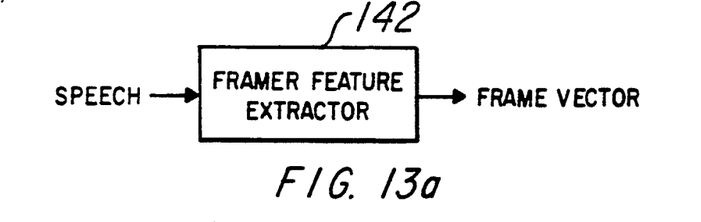
FIGS. 13a and 13b are functional diagrams illustrating a speech compression application.
Figure 13B:
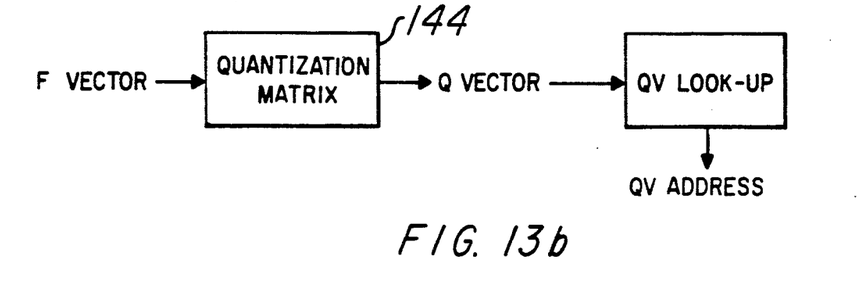

Another application in which the present invention may advantageously practiced relates to speech compression. FIGS. 13a and 13b depict in block diagram form apparatus for accomplishing such a function. The technique of principle spectral components can be utilized to convert speech into a Euclidean metric. That is, minimum distance classification schemes can be utilized for processing speech information. The systolic correlation processor of the invention can be utilized as a high speed speech vector recognizer.

The basic speech compression process is shown in FIGS. 13a and 13b. Initially, raw human speech signals are periodically sampled and processed by a speech processor, called a framer 142. The processor converts each time window of sampled speech, or frame, into a vector whose components indicate the energy content, average pitch, duration, etc. of each frame.

The serial output of the speech framer 142 is a serial stream of speech frame vectors which contains a very accurate representation of the information content of the original speech signal. In particular, the frame vectors may be used in a reverse process to accurately reconstruct the original speech waveform. In this manner, speech signals may be processed into a compact form, and then reconstructed later or used in, for example, a speech recognition process which uses the feature vectors to identify the original speaker.

Importantly, it is known that a set of a few thousand ideal speech frame vectors is adequate to approximate the wide range of possible frame vectors which could be produced by the processing of arbitrary human speech. For this reason, it is possible to further compact or compress the representation of human speech patterns by finding which of this small set of ideal speech vectors, or templates, best matches each speech frame vector produced by the framer 142. This "best match" procedure is usually called the vector quantization process, and is carried out by the vector quantizer 144, shown in FIG. 13b.

Once the best speech frame template vector has been discovered, it is only necessary to record the names of the templates to uniquely define the serial list of speech vectors. It has been shown that very dramatic compression of speech signals can be achieved in this manner without unduly sacrificing information content.

Unfortunately, the conventional methods which determine the closest template vector to each frame vector are relatively slow. Real time speech compression with this method requires very complex and high speed electronic signal processing hardware.

The systolic correlation processor of the invention can be used to determine which speech template vector best matches each feature vector in real time. The correlation memory of this invention can quickly map a serial representation of each frame vector into the stored vector to which it is most similar. As a result, the lengthy template matching process can be reduced to a single cycle matching operation. In practice, the template vector output from the correlation memory would be used to directly address a table of template names, which is shown as the QV lookup operation 146 in FIG. 13b.

Figure 14A:
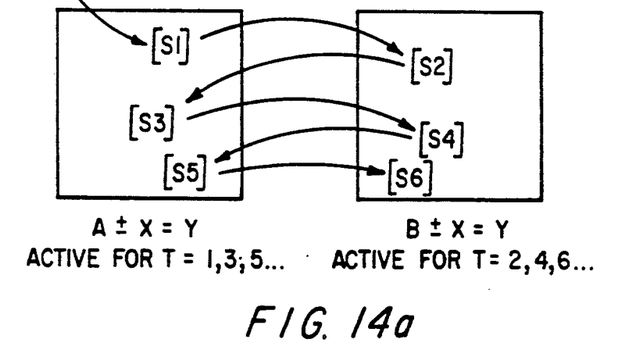
FIGS. 14a, 14b, and 14c are functional diagrams illustrating an application of state sequency through layering.
Figure 14B:
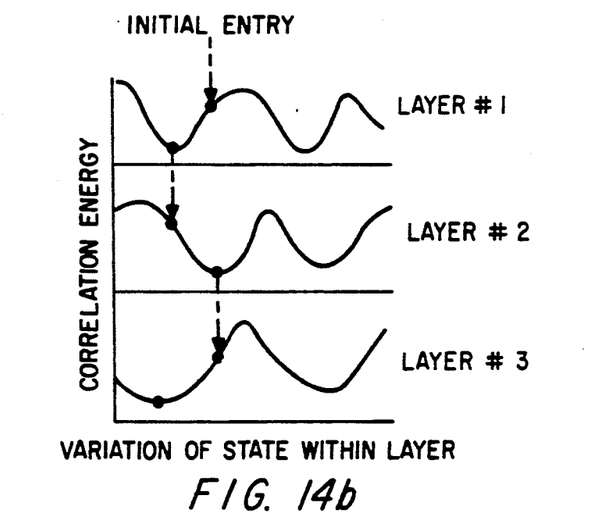
Figure 14C:
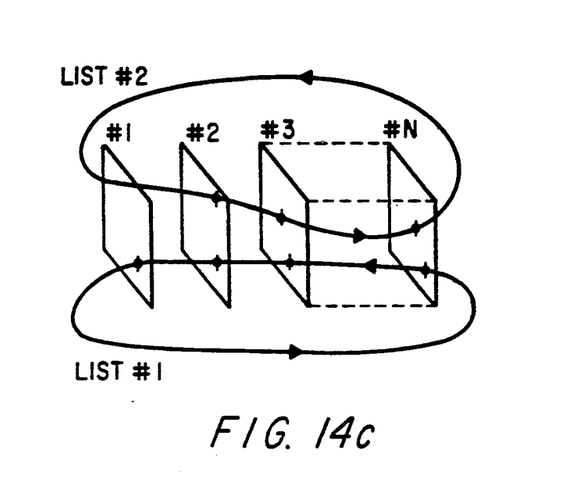

Layering of correlation matrices is also made possible by the use of the present invention. FIGS. 14a–14c illustrate the layering concept. A correlation matrix which holds maximally separated states has a storage capacity of about $N/4\log N$ states, where N is the vector length of the stored states. For example, a 128 by 128 matrix can store perfectly about ten states Increased storage causes states to "collide", thereby distorting the stored data. Furthermore, the $N/4\log N$ states which can be usefully stored must also be maximally separated in state space. Storing similar states appears to the matrix like over-saturation of capacity which leads to state distortion. This can occur even if much less than $N/4\log N$ similar states are stored.

In order to increase the storage capacity in accordance with the correlation matrix concept, matrices are layered such that similar stored states are assigned to different matrix layers. This process solves the problem of state collision by the addition of matrices. Moreover, adding matrix layers linearly increases the total storage capacity, all without requiring an increase in the dimensionality of the system. Of course, the number of interconnects used to perform the storage has not changed in the maximally separated case. Thus, the total bit capacity is $M \cdot N \cdot N/4\log N$, where M is the number of layers.

The foregoing concept envisions parallel matrix operations (where queries are applied to all matrices in parallel), or where one level of matrix operations feeds the processors, via higher layers. A multi-level multi-goal machine is thus realized.

The straight-forward layering of matrices permits temporal sequency within a group of stored states. A layered structure for use with temporal sequency is illustrated in FIG. 14c. A query is applied to layer number 1, and from layer number 1 there emerges the "best match" of the query, together with a stored state acquired from layer number 1. This state might represent a match at time $t=0$. This state, state number 1, would then be applied to layer number 2 which would be constructed so that layer number 1 is mapped into layer number 2 space in order that an output state from layer number 1 produces a new state in layer number 2, not necessarily similar to state number 1.

Thus, each succeeding layer not only finds best matches to input queries but also performs preprocessing maps so that a sequence of temporally linked states can be followed. Digital correlators, such as the serial systolic processor described above, is advantageous in allowing the recovery of not just the closest data words stored in a correlation memory, but lists of data, triggered by a close match of an input query to one member of the data list. Temporal state sequency applications are thus well within the realm of solution by the present invention.

State sequency through layering provides cross correlations between pairs of sequentially related data words, such that the presentation of the first member of a list stimulates the second member of a list, and so on. This can be accomplished with a single correlation matrix, but not without the chance of introducing instability. The layered approach allows lists of items to be sequentially recalled in an orderly clocked fashion. In addition, the last member of a list can be cross correlated with the first member, so that the recall of any list item automatically recalls the entire list in sequence. Multiple lists can then be stored in this manner.

Not only can lists of vectors be recalled, but if one projects all layer entries onto a single data space of the same dimensionality, it can be seen that the effective packing density of vectors in a state space can be much greater than in a single matrix. It should be noted, however, that the capacity of single correlation matrix memory is limited to about $N/4 \log N$ words, where N is the bit length of the data word.

TECHNICAL ADVANTAGES OF THE INVENTION

From the foregoing, disclosed is a serial systolic processor which provides correlation functions utilizing digital techniques. A significant technical advantage of the invention is that the processor can execute vector-matrix calculations on a serial data stream to thereby correlate an input vector with a stored vector to achieve a result in a manner similar to analog neural networks heretofore known.

An additional technical advantage of the invention is that the computational logic of the processor can be integrated with a memory array, without substantially adding to the complexity of the memory. The memory is row addressable to simultaneously provide a plurality of columns of coefficient data to the computational processor. The entire system is synchronous and sequential for operation in an orderly manner.

With the digital implementation of the memory matrix, current semiconductor fabrication techniques make possible a significant technical advantage in that correlation functions can now be economically realized for applications not heretofore known. For example, the systolic correlation processor of the invention can be advantageously utilized for code detection and correction, temporal sequency and matrix layering. In addition, speech recognition and/or compression is more easily implemented without the use of large code words or lookup-tables which heretofore have made the application inapplicable to encoding and decoding techniques.

An additional technical advantage of the invention disclosed herein enables those skilled in the art to apply the principles and concepts of the invention to expand the applicability of neural networks, whether of the analog or digital type.

While the preferred embodiment of the invention has been disclosed with reference to a specific systolic correlator processor, it is to be understood that many changes in detail may be made as a matter of engineering choices without departing from the spirit and scope of the invention, as defined by the appended claims.

What is claimed is:

1. A digital computational device, comprising:
   a digital memory for storing a plurality of digital coefficients, said memory arranged into rows and columns, and including a plurality of outputs through which a selected row of said coefficients can be simultaneously read;
   means for establishing in said memory coefficients corresponding to an autocorrelation matrix;
   a plurality of logic circuits, each having a first input and an output, said first inputs and outputs thereof being connected together such that said logic circuits are series connected to process a serial data stream of plural data elements, each of said logic circuits further including a second input connected to a respective said output of said memory;
   means for clocking said memory and said logic circuits so that the data elements of said data stream are serially shifted through said logic circuits and said coefficients are read from said memory, whereby said coefficients and each said data element can be processed by said logic circuits to perform associative memory functions;
   wherein each of said logic circuits includes a shift register means for shifting said data elements from the first input thereof to the output thereof in response to said clocking means;
   wherein said shift register means shifts the data elements through each of said logic circuits without changing said data elements;
   further including means for performing a digital computational of the data elements and said digital coefficients output by said memory; and
   wherein said means for performing performs an EXCLUSIVE-OR function.

2. The digital computational device of claim 1 wherein said means for performing includes an output, and each said logic circuit. Further includes means for modifying the data output by said performing means based upon a result of a computation performed by another one of said logic circuits.

3. The digital computational device of claim 2 wherein said modifying means comprises a digital adder, and further including a storage element responsive to said clocking means for storing the result of said adder.

4. The digital computational device of claim 1 wherein said means for performing includes an output, and further including a counter responsive to the output of said performing means for totalizing data output by said performing means.

5. The digital computational device matrix of claim 4 wherein said counter comprises an up/down counter.

6. The digital computational device of claim 5 further including means for presetting said counter to a desired state, and means for indicating a most significant bit and a least significant bit output, and means for up counting in response to a first digital state output by said performing means, and for down counting in response to a second digital state output by said performing means.

7. The digital computational device of claim 1 wherein said memory comprises a single memory unit on a substrate with plural said outputs.

8. The digital computational device of claim 7 wherein said logic circuits are integrated into said substrate.

9. A digital computational device comprising:
   a memory formed in a semiconductor substrate, said memory comprising:
     a plurality of storage elements each for storing a digital coefficient,
     a plurality of addressable rows and columns for simultaneously accessing a desired number of said storage elements,
     means for addressing said rows and said columns to simultaneously read a plurality of said storage elements, a plurality of outputs for carrying a plurality of digital coefficients read from said plurality of storage elements corresponding to an addressed row;

an external input for providing a serial data stream of digital data; and a computational logic circuit formed in said semiconductor substrate, said logic circuit having:
  a first input connected to said external input,
  a plurality of second inputs connected to a corresponding plurality of said memory outputs,
  means for performing a logic operation on each bit of said data stream with a digital coefficient stored in a storage element of each column of said memory, and for providing an output indicating a correlation therebetween.

10. The digital computational device of claim 9 further including in said logic circuit an EXCLUSIVE-OR circuit for correlating the bits of said bit stream with the digital coefficients stored in said memory.

11. The digital computational device of claim 9 further including a shift register formed in said semiconductor substrate for storing the results of said correlation, and means for shifting a correlated bit stream to an output.

12. The digital computational device of claim 9 further including means for shifting said data stream after the last bit of said input data stream has been correlated with a digital coefficient stored in said memory.

13. The digital computational device of claim 9 further including in combination means for loading digital autocorrelation matrix elements of speech frame vectors in said memory, and means for coupling speech signals via said data stream to be correlated with said vectors.

14. The digital computational device of claim 9 further including in combination means for loading into said memory digital coefficient data corresponding to autocorrelation matrix elements of code symbols, and means for coupling coded symbols through said input data stream to be correlated with said coefficient data.

15. The digital computational device of claim 14 further including means connected to said means for loading for generating random code vectors which are uniquely associated with predefined alphanumeric data.

16. The digital computational device of claim 9 further including a common clock for providing clock signals to said memory and to said computational logic circuit such that memory operations occur synchronously with logic circuit computational operations.

17. The digital computational device of claim 9 wherein said computational logic circuit is arranged to provide an associative memory correlation function.

18. The digital computational device of claim 9 integrated into a single semiconductor substrate.

19. A method of processing input data, comprising the steps of:
  providing the input data in the form of a serial bit stream;
  shifting the bits of said steam unchanged through a plurality of series-connected data processors;
  storing coefficient data in a memory, said memory arranged into rows and columns;
  reading a selected row of said memory to provide a plurality of said coefficient data to a corresponding said plurality of data processors; and
  processing said coefficient data with said input data and storing the results thereof in said memory.

20. The method of claim 19 further including synchronizing the reading of said memory with a shifting of the bits.

21. The method of claim 19 further including totalizing said results of each of said processors.

22. The method of claim 21 further including totalizing said results by incrementing or decrementing a counter.

23. The method of claim 22 further including storing in said memory coefficient data for correlation with said input data, and further including incrementing said counter when said result corresponds to a correlation, and decrementing said counter when said result corresponds to a noncorrelation.

24. The method of claim 23 further including storing said input data bit unchanged if said results corresponds to a correlation, and storing said input data bit inverted if said result corresponds to a noncorrelation.

25. The method of claim 19 further including reading said memory and outputting said results.

26. The method of claim 19 further including storing coefficient data in said memory corresponding to autocorrelation matrix elements of speech frame vectors.

27. The method of claim 19 further including storing coefficient data in said memory corresponding to autocorrelation matrix elements of code symbols.

28. The method of claim 19 further including storing in said memory coefficient data representative of autocorrelation matrix elements of an image.

29. The method of claim 19 further including storing in said memory coefficient data representative of autocorrelation matrix elements of a binary coded number.

* * * * *